(12) United States Patent
Howard et al.

(10) Patent No.: US 7,549,678 B2
(45) Date of Patent: Jun. 23, 2009

(54) SYSTEMS FOR ACTUATING A PIPE CONNECTION

(75) Inventors: Erik M. Howard, Baytown, TX (US); Charles Armbrust, Houston, TX (US)

(73) Assignee: Taper-Lok Corporation, Houston, TX (US)

( * ) Notice: Subject to any disclaimer, the term of this patent is extended or adjusted under 35 U.S.C. 154(b) by 132 days.

(21) Appl. No.: 11/247,339

(22) Filed: Oct. 11, 2005

(65) Prior Publication Data

US 2007/0080535 A1    Apr. 12, 2007

(51) Int. Cl.
*F16L 17/00* (2006.01)
(52) U.S. Cl. .................. 285/98; 285/96; 285/100; 285/106; 285/272; 285/920
(58) Field of Classification Search .............. 285/95, 285/96, 98, 106, 100, 900, 920, 924, 272; 29/453, 522.1; 464/26, 160, 901; 403/341, 403/351, 353
See application file for complete search history.

(56) References Cited

U.S. PATENT DOCUMENTS

| | | | | |
|---|---|---|---|---|
| 1,571,958 A | * | 2/1926 | Mueller et al. ............... | 73/46 |
| 2,712,458 A | | 7/1955 | Lipson | |
| 3,147,992 A | * | 9/1964 | Haeber et al. ............... | 285/18 |
| 3,198,213 A | * | 8/1965 | Schindel ...................... | 138/31 |
| 4,049,297 A | * | 9/1977 | Reneau ......................... | 285/24 |
| 4,291,889 A | * | 9/1981 | Hardcastle .................. | 277/328 |
| 4,877,217 A | * | 10/1989 | Peil et al. ..................... | 251/1.3 |
| 5,014,598 A | * | 5/1991 | Champagne ................ | 92/13.5 |
| 5,117,743 A | * | 6/1992 | Yuda ........................... | 92/128 |
| 5,591,098 A | * | 1/1997 | Jones et al. ................. | 475/231 |
| 6,780,137 B1 | * | 8/2004 | Langenfeld ................. | 475/231 |

* cited by examiner

*Primary Examiner*—James M Hewitt
*Assistant Examiner*—Jay R Ripley
(74) *Attorney, Agent, or Firm*—Law Offices of Mark L. Berrier

(57) ABSTRACT

Systems for actuating a pair of pipe flanges to cause the flanges to be sealingly engaged. In one embodiment, a connection includes a first flange, a second flange and a coupling. The first and second flanges have complementary mating surfaces. The coupling engages both the first and second flanges, with the flanges oriented so that their mating surfaces face each other. The coupling movably engages the first flange to form a cavity between the coupling and the flange. When fluid is forced into the cavity, expansion of the cavity moves the first mating surface toward the second mating surface. This is continued until the mating surfaces make contact and a desired amount of pressure is applied between them to create a seal. The pressure of the fluid is distributed evenly through the cavity, so the contact pressure between the mating surfaces of the flanges is also evenly distributed.

8 Claims, 5 Drawing Sheets

SYSTEMS FOR ACTUATING A PIPE CONNECTION

BACKGROUND

1. Field of the Invention

The invention relates generally to pipe connections, and more particularly to systems and methods for hydraulically actuating a pair of pipe flanges to cause them to be sealingly engaged.

2. Related Art

The use of pipelines for handling large volumes of fluids is widely known. High-volume pipelines are commonly used for fluid hydrocarbons such as oil or natural gas. The pipelines used in these applications typically consist of a number of pipe sections which are connected end-to-end to form a single conduit.

In many instances, these pipelines carry fluids that may be toxic, volatile, corrosive or otherwise dangerous. Often, it is necessary to pressurize the fluids that are carried by the pipelines. Because it may be potentially dangerous for fluids to escape from the pipelines, it is very important to ensure that the connections between pipe sections in the pipelines do not leak.

The integrity of the seal between two pipe sections in a pipeline depends on a number of factors, including the type of connection between the pipe sections, the type of gaskets or seals used in the connection, and even the manner in which the connection is assembled. The manner in which the connection is assembled is also an important factor in the reliability of the connection. Improper assembly of a connection may cause the connection to leak or to fail entirely.

Most conventional connections between pipe sections utilize flanges at the ends of the pipe sections that are bolted together with a seal ring or gasket between them. It is important in the assembly of these connections to ensure that the flanges are evenly tightened so that the load (the force holding the flanges together) is evenly distributed across the sealing faces of the flanges. If the distribution is uneven, less pressure may be applied on one side of the flanges, causing the connection to leak. Uneven distribution of force in a connection that uses bolts to hold the flanges together may also cause more heavily loaded bolts to fail, which may then lead to leaks or failure of additional bolts and/or the connection itself.

Because of the importance of evenly distributing the load across the sealing surfaces in the connection, it is typical in assembling conventional bolted-flange connections to check the torque on each of the bolts when the connection is assembled to ensure that each of the bolts carries nominally the same load. Changing conditions, however, may affect the loading on individual bolts so that, even if the bolts originally carried the same load, the individual loading of the bolts may change, causing uneven distribution of the force applied by the bolts around the connection.

Bolt tensioners provide an alternative mechanism for ensuring that force is evenly applied around the circumference of the flanges. A bolt tensioner is a hydraulically expandable device that is placed around an individual bolt, between the flange and a nut that is threaded onto the bolt. Hydraulic pressure is used to expand the tensioner until a known amount of force is applied by the tensioner between the nut and the flange. Typically, when bolt tensioners are used, an individual bolt tensioner is placed on each bolt, and the same hydraulic pressure is applied to each of the bolt tensioners in order to apply the same amount of force around the circumference of the flanges.

While this mechanism is helpful in ensuring that force is evenly distributed across the sealing faces of the connection without having to individually check the torque of each nut as it is tightened on to the corresponding bolt, it has its own drawbacks. For example, because it is necessary to install a tensioner on each of the bolts of the connection, the system of tensioners itself becomes a rather complicated hydraulic system. Because the bolt tensioning system may be very complex, it may be very expensive. Moreover, the complexity of the system carries with it an increased risk that it, too, may fail.

It would therefore be desirable to provide systems and methods for ensuring that force is evenly applied around the sealing faces of a connection which do not suffer from the drawbacks of the prior art.

SUMMARY OF THE INVENTION

One or more of the problems outlined above may be solved by the various embodiments of the invention. Broadly speaking, the invention comprises systems and methods for actuating a pair of pipe flanges by means such as hydraulic expansion of a cavity behind at least one of the flanges to cause the flanges to be sealingly engaged. (It should be noted that, as used herein, the term "flange" is intended to include not only projecting edges as found in conventional bolted flanges, but also any other structure at an end or opening of a pipe, hose, conduit, or the like which is used to make a connection with a similar structure of another pipe, hose, conduit, or the like.)

One embodiment comprises a hydraulically actuated connection including a first flange, a second flange and a coupling. The first flange has a first mating surface and the second flange has a second mating surface complementary to the first. The coupling engages both the first and second flanges, with the flanges oriented so that their mating surfaces face each other. The coupling movably engages the first flange to form a cavity between the coupling and the flange. When fluid is forced into the cavity, expansion of the cavity moves the first mating surface toward the second mating surface. This is continued until the mating surfaces make contact and a desired amount of pressure is applied between them to create a seal. The hydraulic pressure is distributed evenly through the cavity, so the contact pressure between the mating surfaces of the flanges is also evenly distributed.

In one embodiment, the cavity is positioned around an axis of the first flange. The cavity may, for example, be annularly shaped. In one embodiment, the expansion of the cavity (the actuation of the connection) creates a gap between the coupling and the first flange into which spacers (e.g., a stepped ring) can be positioned to maintain contact between the flanges. The connection may be designed so that the spacers are automatically positioned in the gap when the connection is actuated. The connection may also be designed to enable a good seal between the flanges even when the flanges are not axially aligned.

An alternative embodiment comprises a method including positioning a first flange and a coupling to form a cavity therebetween, connecting the coupling to a second flange, and hydraulically expanding the cavity to force the first flange into sealing engagement with the second flange. The method may include locking the connection in an actuated position, such as by inserting spacers in gaps that are formed between the coupling and the first flange when the connection is actuated. The locking mechanism may be performed manually or automatically. In one embodiment, the method may be performed (and a good seal obtained) when the first and second flanges are not axially aligned.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
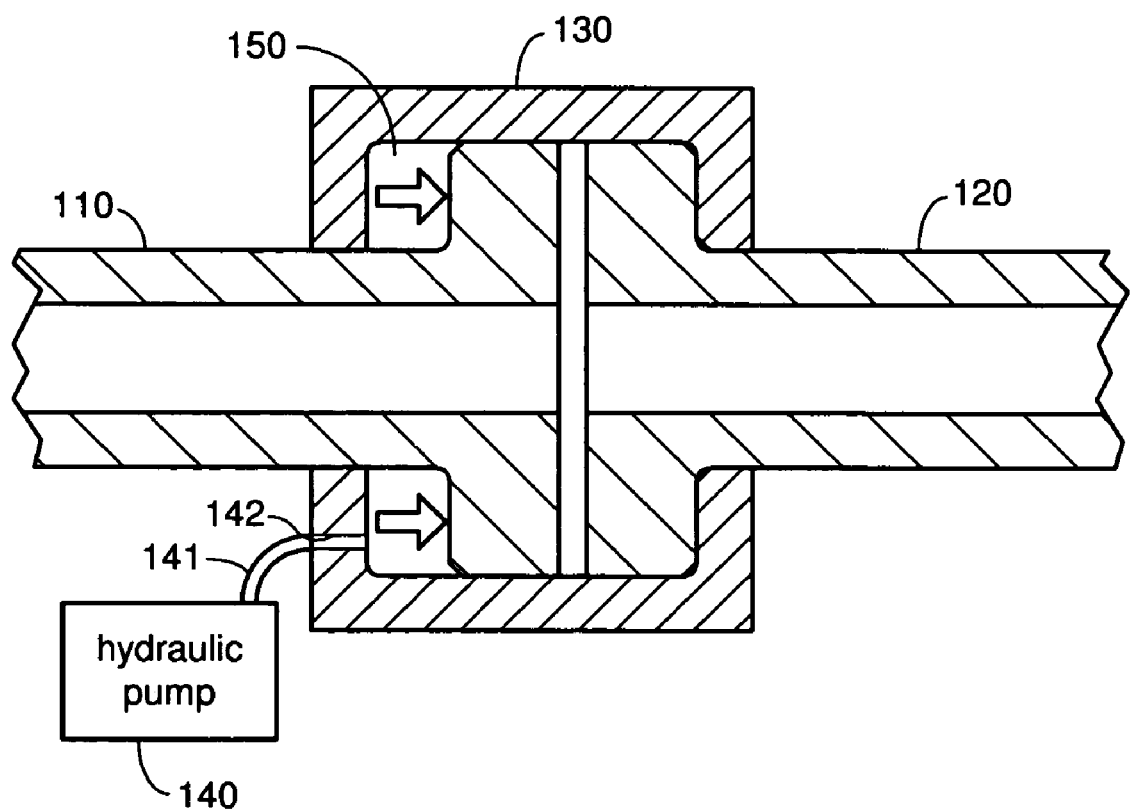
FIG. 1 is a diagram illustrating the concept of a hydraulically actuated connection in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for evenly applying hydraulic pressure to a first flange in order to force the first flange into contact with a second flange and to maintain contact pressure between the first and second flanges so that the integrity of a seal between the flanges is maintained.

In one embodiment, a connection includes a pair of flanges and a coupling which is configured to hold to the flanges together and to apply sufficient pressure to ensure that a seal is formed between the mating surfaces of the flanges. In this embodiment, the coupling is configured to be positioned around the neck of a first one of the flanges so that the first flange is movable within the coupling. The coupling is also configured to be secured to the second one of the flanges so that the mating surfaces of the first and second flanges face each other. When the coupling is secured to the second flange, the first flange can move within a limited range: axial and the second flange.

The first flange and the coupling are configured to form a cavity, or hydraulic pocket, between them. In this embodiment, the hydraulic pocket has an annular or torroidal shape which is roughly symmetric about the axis of the flange and coupling. A port through the coupling allows the hydraulic pocket to be in fluid communication with a hydraulic pump. After the connection (the two flanges and the coupling) is assembled, the hydraulic pump forces hydraulic fluid through the port and into the hydraulic pocket. The pressure of the hydraulic fluid causes the hydraulic pocket to expand, forcing the first flange toward the second flange. When the first flange comes into contact with the second flange, the hydraulic pocket can no longer expand (to any significant degree,) and the pressure of the hydraulic fluid is translated into contact pressure between the first and second flanges. Because of the hydraulic pocket is annular, the pressure is applied evenly around the circumference of the flanges. (In other embodiments, the cavity may not be annular, but may instead have connected portions that are positioned around the axis of the flange/coupling.) The contact pressure between the flanges can be adjusted by increasing or decreasing the hydraulic pressure applied by the hydraulic pump.

In one embodiment, the first flange and the coupling are configured so that spacers can be inserted into one or more gaps that are formed between the first flange and coupling as the hydraulic pocket expands. By placing spacers in these gaps, a mechanical means is provided to maintain the contact between the first and second flanges, even if the hydraulic pump fails. It is also possible to use the hydraulic mechanism to actuate the connection (i.e., force the flanges together and apply the initial contact pressure,) then insert spacers and remove the hydraulic pressure so that the spacers serve as the primary means for maintaining contact between the flanges. In another embodiment, the flanges may be configured to provide such other features as misalignment capability.

Referring to FIG. 1, a diagram illustrating the concept of a hydraulically actuated connection is shown. It should be noted that this figure provides only a simplified illustration of the concept, rather than a detailed representation of a specific embodiment.

As depicted in FIG. 1, a connection includes a first flange 110, a second flange 120 and a coupling 130. Coupling 130 is connected to flange 120 in a manner that limits the movement of the coupling toward flange 110. For example, coupling 130 may be rigidly connected to flange 120 so that there is no relative movement between these components. Alternatively, coupling 130 may have a collar portion that contacts the shoulder of flange 120, allowing the coupling to move toward flange 110 only until the collar portion of coupling 130 contacts the shoulder of flange 120.

Flange 110 fits within coupling 130 and is movable with respect to the coupling. A cavity 150 is formed between coupling 130 and a shoulder or rearward facing portion of flange 110. When the connection (i.e., flanges 110 and 120 and coupling 130) is assembled, the volume of cavity 150 increases as flange 110 moves toward flange 120, and decreases as flange 110 moves away from flange 120. Portions of cavity 150 are positioned around the circumference of flange 110 and coupling 130. Cavity 150 may, for example, be annular in shape.

A hydraulic pump 140 is coupled to the connection via one or more hydraulic lines 141. Hydraulic lines 141 are, in turn, coupled to cavity 150 via corresponding ports 142. Ports 142 may be provided in flange 110 or coupling 130. Ports 142 allow fluid communication between hydraulic pump 140 and cavity 150, so that the hydraulic pump can force hydraulic fluid into the cavity. By forcing hydraulic fluid into cavity 150, hydraulic pump 140 causes the cavity to expand, thereby forcing flange 110 toward flange 120. When the face of flange 110 comes into contact with the face of flange 120, cavity 150 can no longer expand to any substantial degree, so increasing hydraulic pressure applied by hydraulic pump 140 results in contact pressure between the faces of flanges 110 and 120. This contact pressure ensures a seal between flanges 110 and 120.

As noted above, cavity 150 has portions which are positioned around to the circumference of flange 110 and coupling 130. All of these portions are in fluid communication with each other, so hydraulic pressure that is present in one of these portions is also present in the other portions. This hydraulic pressure, as applied to the rearward facing portion of flange 110, is evenly distributed around the circumference of the flange. The even distribution of the hydraulic pressure results in an even distribution of contact pressure around the circumference of flanges 110 and 120. This evenly distributed contact pressure is achieved in the connection without the need to adjust individual bolts around the circumference of the flanges, and without the need to provide bolt tensioners on each of the bolts around the circumference of the flanges.

Figure 2:
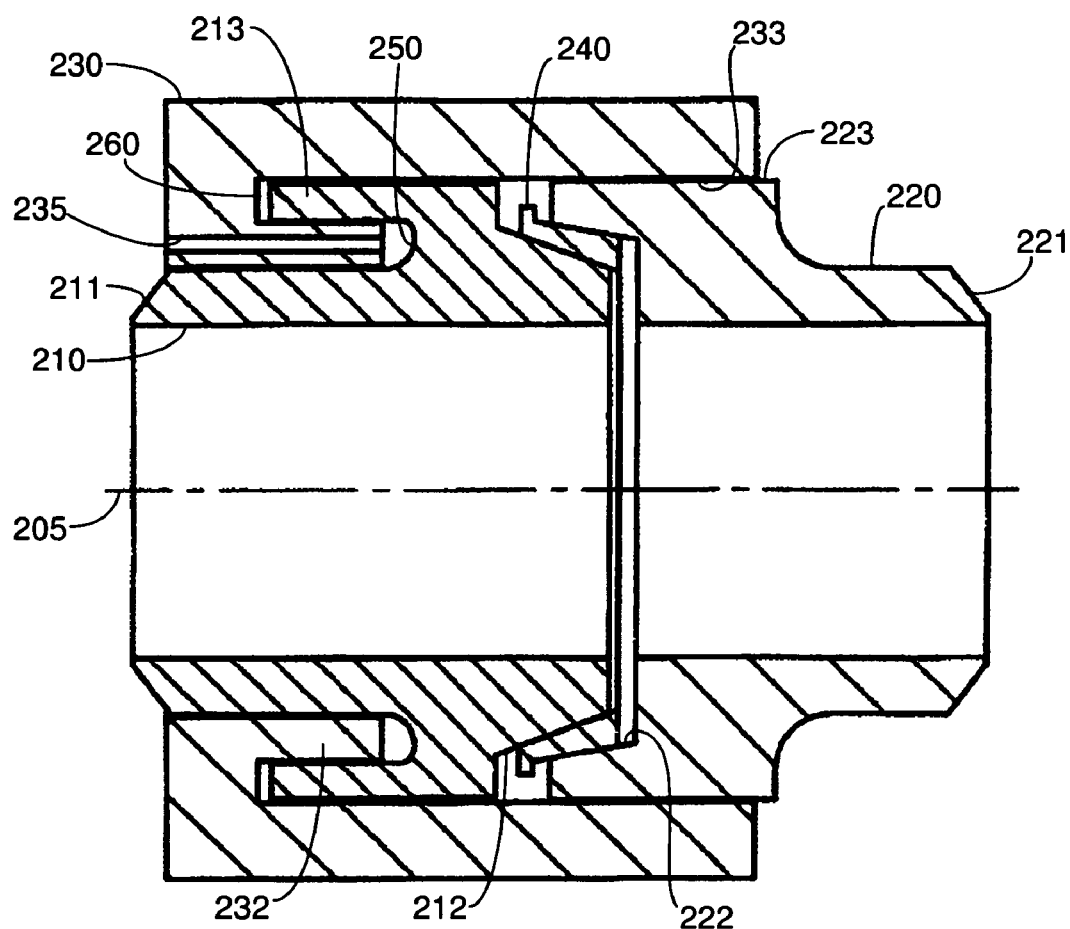
FIG. 2 is a diagram illustrating a cross-sectional view of a connection in accordance with one embodiment.

Referring to FIG. 2, a diagram illustrating a cross-sectional view of a connection in accordance with one embodiment is shown. An axis 205 is illustrated through the center of the connection. The various components of the connection are generally symmetric about this axis, except as described below.

In this embodiment, the connection again comprises a first flange 210, a second flange 220 and a coupling 230. A seal ring 240 is also provided to ensure the integrity of the seal. The forward end of flange 220 (i.e., the end that faces flange 210) has a female mating surface 222. Female mating surface 222 is recessed to accommodate seal ring 240 and the male mating surface of flange 210. Flange 220 has external threads 223 for securing coupling 230. The rearward end of flange 220 (i.e., the end facing away from flange 210) has a surface 221 to facilitate welding of flange 220 two a corresponding pipe section.

The forward end of flange 210 (the end facing flange 220) has a male mating surface 212. Male mating surface 212 forms a nose which fits within the recess formed by female mating surface 222 of flange 220 (as separated by seal ring 240.) The rearward end of flange 210 has a beveled surface 211 to facilitate welding of the flange to a corresponding pipe section. Flange 210 has an external "cup" shaped portion formed by outer wall 213 and the neck of the flange. There is a gap in this cup-shaped portion between outer wall 213 and the neck of the flange.

Coupling 230 fits around the periphery of each of flanges 210 and 220. Coupling 230 has an internal cup-shaped portion formed by inner wall 232 and the outer body of the coupling. In this embodiment, coupling 230 includes internal threads 233 which are complementary to the external threads 223 of flange 220. Coupling 230 can therefore be secured to flange 220 by screwing the coupling onto the flange. Flange 210, the other hand, is allowed to slide back and forth (in a small range) within coupling 230. Flange 210 can slide forward into contact with seal ring 240 and flange 220 (as shown in the figure,) or it can slide backward until external wall 213 comes into contact with the end of the gap within the cup-shaped portion of coupling 230.

As shown in FIG. 2, outer wall 213 of flange 210 fits within the gap of cup-shaped portion formed by inner wall 232 and the body of coupling 230. Similarly, inner wall 232 of coupling 230 fits within the gap of the cup-shaped portion formed by outer wall 213 and the neck of flange 210, thereby forming cavity 250. Cavity 250 is annular in shape in this embodiment. Flange 210 and coupling 230 are configured so that a seal is formed between inner wall 232 and the gap of the cup-shaped portion of flange 210. (Hydraulic seals may be necessary for this purpose, but these seals are not explicitly shown in the figure for purposes of clarity.) Coupling 230 includes one or more ports 235 in order to provide a path for fluid communication between cavity 250 and an external source of pressurized hydraulic fluid (e.g., a hydraulic pump, not shown in the figure.) When hydraulic fluid is forced through ports 235 into cavity 250 pressure is applied by the hydraulic fluid evenly throughout cavity 250, forcing flange 210 into engagement with seal ring 240 and flange 220, and applying pressure evenly around the flange. As pointed out above, this results in evenly distributed contact pressure between flanges 210 and 220 (and seal ring 240.)

After a hydraulically actuated connection such as shown in FIG. 2 is actuated (i.e., after hydraulic pressure is applied to force flange 210 into contact with seal ring 240 and flange 220,) it may be desirable to lock the connection in the actuated position. When the connection of FIG.. 2 is actuated, a gap 260 is created between outer wall 213 and coupling 230. In one embodiment, spacers can be positioned in gap 260. These spacers provide a locking mechanism that prevents movement of flange 210 out of engagement with seal ring 240 and flange 220. The integrity of the seal between flanges 210 and 220 (and seal ring 240) can thereby be maintained, even if there is a loss of hydraulic pressure within cavity 250.

Figure 3A:
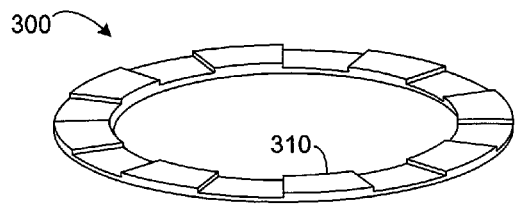
FIGS. 3A-3F are a set of diagrams illustrating a spacer suitable for use in connection with the connection of FIG. 2.
Figure 3D:
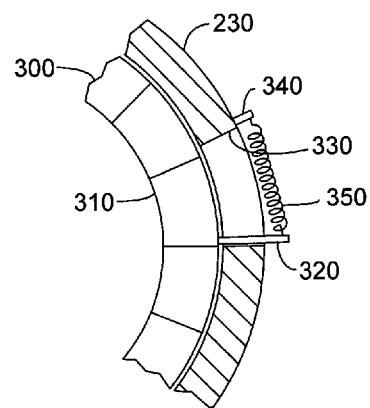
Figure 3B:
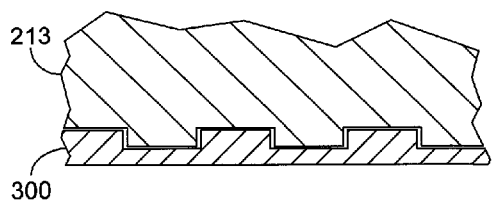
Figure 3E:
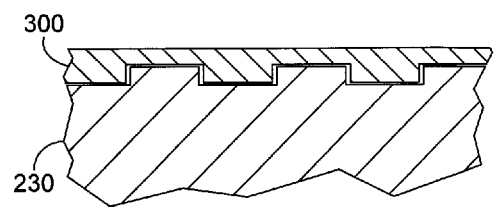
Figure 3C:
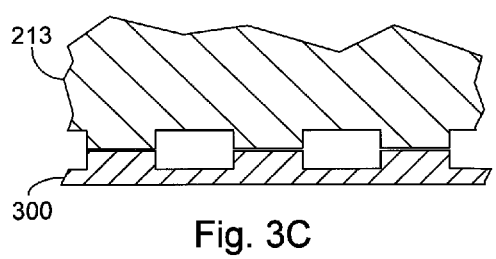

Referring to FIGS. 3A-3D, a set of diagrams illustrating a spacer suitable for use in connection with the connection of FIG. 2 is shown. FIG. 3A is a perspective view of an exemplary spacer. FIG. 3B is a diagram illustrating the positioning of the spacer and the cup-shaped portion of the male flange of FIG. 2 prior to actuation of the connection. FIG. 3C is a diagram illustrating the positioning of the spacer and the cup-shaped portion of the male flange of FIG. 2 after actuation of the connection. FIG. 3D is a diagram illustrating a mechanism for automatically positioning the spacer with respect to the cup-shaped portion of the male flange of FIG. 2.

Referring to FIG. 3A, it can be seen that spacer 300 has the shape of a stepped ring. Spacer 300 has a generally annular shape that allows the spacer to fit within gap 260 between flange 210 and coupling 230. Spacer 300 also has a plurality of raised portions or "steps" (e.g., 310) that are evenly distributed around the circumference of the spacer. Spacer 300 is designed to be used in conjunction with a male flange 210 that has a cup-shaped portion 213 with set of recessed portions that are complementary to the raised portions of the spacer.

Spacer 300 can be positioned in either of two ways. First, as shown in FIG. 3B, the spacer can be positioned so that the raised portions of the spacer fit within the recessed portions of the cup-shaped portion of the flange. When spacer 300 is in this position, gap 260 can be minimized. This corresponds to flange 210 being positioned out of engagement with seal ring 240 and flange 220 (i.e., to the left in FIG. 2.) The second possible position of spacer 300 is shown in FIG. 3C. In this position, the raised portions of spacer-300 contact the raised (rather than recessed) portions of the cup-shaped portion of the flange. This corresponds to flange 210 being engaged with seal ring 240 and flange 220 (i.e., to the right in FIG. 2.) The positioning of flange 210 with respect to coupling 230 differs in FIGS. 3B and 3C by the height of the raised portions (e.g., 310) of spacer 300.

Figure 3F:
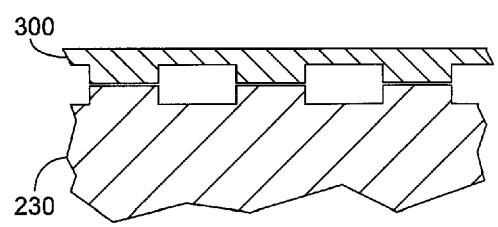

As shown in FIGS. 3B and 3C, the steps of spacer 300 are in contact with corresponding steps or recesses in the cup-shaped portion of the flange. In alternative embodiments, however, the steps could be on the other side of the spacer, and could contact corresponding steps or recesses formed in the coupling, 230, instead of the flange, as shown in FIGS. 3E and 3F. The spacer could also have steps on both sides. In still other alternative embodiments, other types of mechanical locking mechanisms could be used to ensure that contact between the flanges and/or seal ring is maintained.

In one embodiment, spacer 300 is spring-loaded so that, when the connection is actuated and gap 260 increases, the spacer is automatically moved into the second position, locking flange 210 into engagement with seal ring 240 and flange 220. This feature may be implemented, for example, by providing a small arm which extends outward from spacer 300 and providing an aperture in coupling 230 through which the arm can extend and be externally accessible. Referring to FIG. 3D, arm 320 is connected to a post 340 attached to exterior of coupling 230 by a spring 350. Arm 320 is depicted in the figure at a lower end of aperture 330. Spring 350 is extended to apply pressure to arm 320. When the connection is actuated and gap 260 expands, spacer 300 is allowed to rotate, and spring 350 pulls arm 320 toward post 340, so that the spacer is in the second position.

Figure 4:
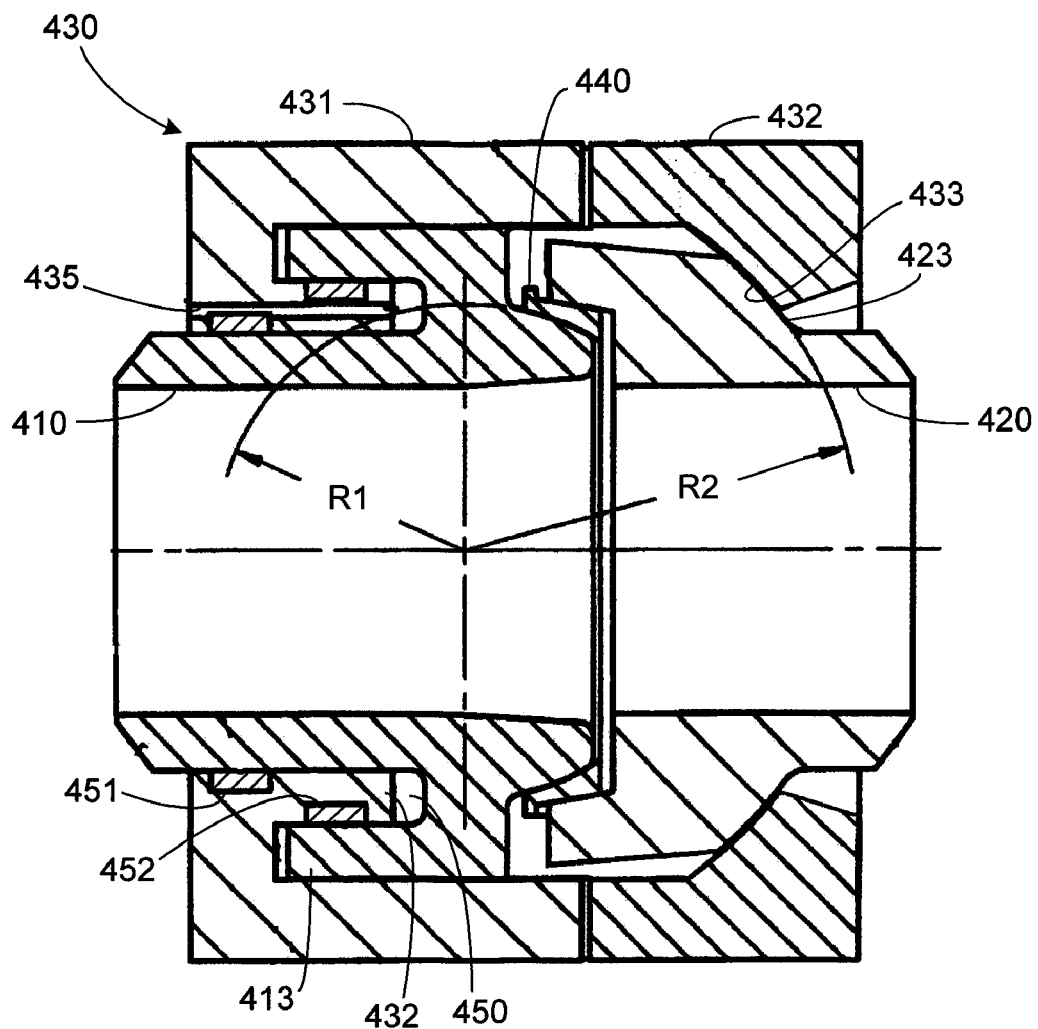
FIG. 4 is a cross-sectional view of a connection in accordance with an alternative embodiment.

Referring to FIG. 4, a cross-sectional view of a connection in accordance with an alternative embodiment is shown. This embodiment includes several features which are not included in the embodiment of FIG. 2. For example, a two-piece coupling is used to hold the flanges together, instead of threading the coupling onto one of the flanges. Another difference is that the connection is designed to allow some misalignment of the flanges.

In the embodiment of FIG. 4, the connection includes a first flange 410, a second flange 420, and a coupling 430 that consists of a first component 431 and a second component 432. A seal ring 440 is positioned between the flanges to enhance the seal. Flanges 410 and 420 have male and female mating surfaces, respectively, on their forward ends that engage seal ring 440 to form a seal when the connection is actuated. The rearward end of each flange is beveled to facilitate welding of the flange to a corresponding pipe section.

As in the embodiment of FIG. 2, coupling 430 fits around the periphery of flanges 410 and 420. The hydraulic actuation mechanism in this embodiment is essentially the same as that shown in FIG. 2. Coupling 430 has an internal cup-shaped portion 432 that fits within a gap in cup-shaped portion 413 of flange 410 to form cavity 450. Hydraulic seals 451 and 452 are explicitly shown in the figure. These hydraulic seals ensure that hydraulic fluid pumped into cavity 450 through port 435 does not leak out of the cavity. The connection is actuated in the same manner described above in connection with the embodiment of FIG. 2.

In the embodiment of FIG. 4, the mechanism by which coupling 430 is connected to flange 420 differs from that shown in FIG. 2. Coupling 430 includes a first component 431 and a second component 432. These components are connected to each other through some mechanical means. Various means may be used, but an exemplary mechanism will be described below in connection with FIG. 5. When the components of coupling 430 are connected, component 432 holds flange 420 in engagement with flange 410 by providing a collar portion 433 that contacts the shoulder 423 of the flange.

As noted above, the connection of FIG. 4 has misalignment capabilities. That is, the connection can maintain sealing engagement between the flanges even when the flanges and corresponding pipe sections are not perfectly aligned. To achieve this capability, several of the flange surfaces are radiused. As shown in FIG. 4, the nose of male flange 410 comprises a convex spherical surface of radius R1 (from center point C1.) Seal ring 440 has a concave surface of the same radius, so that there can be relative misalignment between flange 410 and seal ring 440. The other side of seal ring 440 is a convex conic section which fits within a correspondingly shaped recess in female flange 420. Axial alignment is maintained between seal ring 440 and flange 420. Shoulder 423 of flange 420 is also radiused. In this embodiment, shoulder 423 comprises a convex spherical surface having a radius of Rm. (from center point C1.) Collar 433 has a corresponding concave spherical surface, so that there may be misalignment between coupling component 432 (hence coupling 430) and flange 420.

Figure 5:
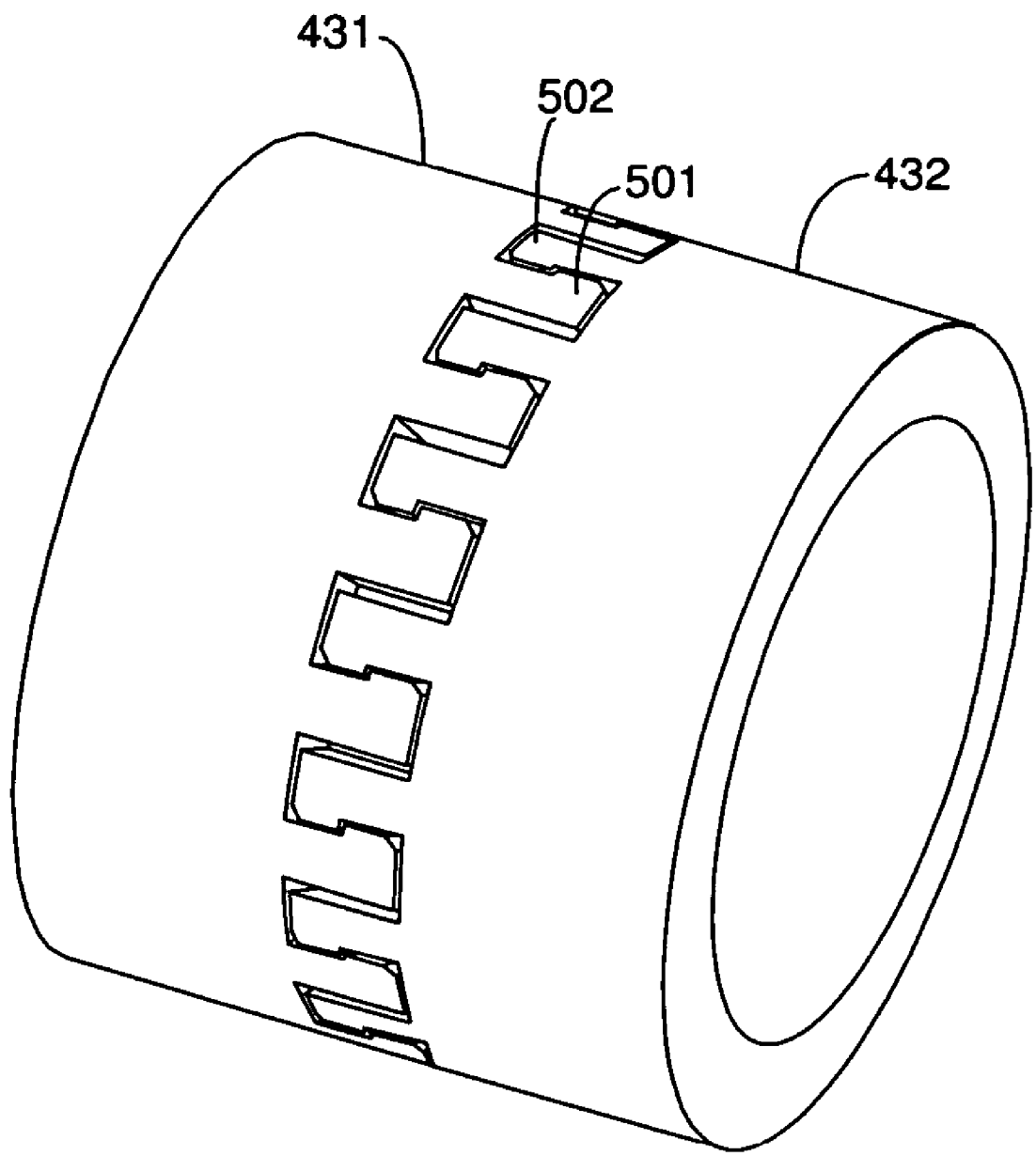
FIG. 5, a perspective view of a coupling in accordance with one embodiment.

Referring to FIG. 5, a perspective view of coupling 430 in accordance with one embodiment is shown. In this embodiment, each of coupling components 431 and 432 has a set of "teeth" (e.g., 501, 502.) Between each of the teeth is a space that is approximately the same width as the teeth. Each tooth has a small lip on one side. Components 431 and 432 are assembled by placing them together with the teeth of each component interlocking. That is, the teeth up one component fit within the spaces of the other component. The two components are then rotated slightly with respect to each other so that the lip of each tooth engages the lip of a corresponding tooth of the other component. Mechanical means such as spacers can be used to prevent counter-rotation and disassembly of the components.

It should be noted that the embodiments described are merely illustrative of the invention, and many alternative embodiments are possible. Alternative embodiments may differ from the above embodiments in ways such as the particular features that are incorporated therein, or the manner in which these features are implemented. For instance, although the embodiments described above use a hydraulic mechanism to move the flanges into engagement with each other, alternative embodiments may use pneumatic pressure, electromotive forces, or other mechanisms to force the flanges together. Further, while the embodiments shown in FIGS. 2 and 4 have male/female mating surfaces, alternative embodiments may have more conventional, flat mating surfaces. Similarly, while the illustrated embodiments utilize a tapered seal ring between the mating surfaces of the flanges, alternative embodiments may use conventional seal rings, or no seal ring at all. Still further, while the illustrated embodiments have an annular cavity that is formed between the coupling and the hydraulically actuated flange, alternative embodiments may have cavities that are not annular, or are irregularly shaped. Numerous other variations are also possible.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for actuating a pair of pipe flanges to cause the pipe flanges to sealingly engage, the system comprising:
    a first pipe flange having a first mating surface and a second pipe flange having a second mating surface complementary to the first mating surface;
    a coupling configured to engage the first and second flanges, wherein the coupling is rigidly connected to the second flange;
    a locking mechanism; and wherein when the coupling engages the first and second flanges, the first flange is oriented with the first mating surface toward the second mating surface of the second flange;

wherein, when the coupling is engaged with the first flange, a cavity is formed between the coupling and the first flange;

wherein, when fluid is forced into the cavity, fluid pressure within the cavity forces a first wall of the cavity, which is formed by the coupling, away from a second wall of the cavity, which is formed by the first flange, and thereby urges the first mating surface toward the second mating surface; and wherein the locking mechanism is configured to maintain sealing contact between the first and second mating surfaces after the fluid pressure forces the first and second mating surfaces into contact with each other, wherein the locking mechanism comprises a spacer positioned between the first flange and the coupling and wherein the spacer comprises a stepped ring configured to be placed in either: a first position in which steps of the spacer are within recesses in the first flange or coupling; or a second position in which steps of the spacer contact steps of the first flange or coupling.

2. A system for actuating a pair of pipe flanges to cause the pipes flanges to sealingly engage, the system comprising:

a first pipe flange, a second pipe flange, a coupling and a locking mechanism;

wherein the first flange has a first mating surface and the second flange has a second mating surface complementary to the first mating surface;

wherein the coupling is configured to engage the first and second flanges;

wherein the coupling is rigidly connected to the second flange;

wherein when the coupling engages the first and second flanges, the first flange is oriented with the first mating surface toward the second mating surface of the second flange;

wherein, when the coupling is engaged with the first flange, a cavity is formed between the coupling and the first flange;

wherein, when fluid is forced into the cavity, fluid pressure within the cavity urges the first mating surface toward the second mating surface;

wherein the locking mechanism has a stepped ring which is positioned between the first flange and the coupling and which is configured to be placed in either a first position, in which steps of the spacer are within recesses in the first flange or coupling, or a second position, in which steps of the spacer contact steps of the first flange or coupling;

wherein the locking mechanism is configured to maintain sealing contact between the first and second mating surfaces after the fluid pressure forces the first and second mating surfaces into contact with each other; and wherein the stepped ring is spring-loaded and configured to move automatically to the second position when the first and second mating surfaces come into contact with each other.

3. The system of claim 2, wherein the cavity has portions that are positioned around an axis of the first flange.

4. The system of claim 3, wherein the cavity is substantially annular.

5. The system of claim 2, wherein the connection is configured to enable sealing engagement between the first and second flanges when the first and second flanges are not axially aligned.

6. The system of claim 2, wherein the coupling comprises two components that are configured to be connected to each other, wherein a first one of the components is configured to contact the first flange to form the cavity, and wherein a second one of the components is configured to abut a rearward end of the second flange and thereby hold the second flange in contact with the first flange.

7. A system for actuating a pair of pipe flanges to cause the pipe flanges to sealingly engage, the system comprising:

a first pipe flange having a first mating surface and a second pipe flange having a second mating surface complementary to the first mating surface;

a coupling configured to engage the first and second flanges: and a locking mechanism;

wherein when the coupling engages the first and second flanges, the first flange is oriented with the first mating surface toward the second mating surface of the second flange;

wherein, when the coupling is engaged with the first flange, a cavity is formed between the coupling and the first flange;

wherein, when fluid is forced into the cavity, fluid pressure within the cavity forces a first wall of the cavity, which is formed by the coupling, away from a second wall of the cavity, which is formed by the first flange, and thereby urges the first mating surface toward the second mating surface;

wherein the locking mechanism is configured to maintain a spacing between the first wall and the second wall after the fluid pressure forces the first and second mating surfaces into contact with each other; and wherein the locking mechanism comprises a spacer positioned between the first flange and the coupling, wherein the spacer comprises a stepped ring configured to be placed in either: a first position in which steps of the spacer are within recesses in the first flange or coupling; or a second position in which steps of the spacer contact steps of the first flange or coupling.

8. The system of claim 7, wherein the stepped ring is spring-loaded and configured to move automatically to the second position when the first and second mating surfaces come into contact with each other.

* * * * *